United States Patent Office 3,276,850
Patented Oct. 4, 1966

3,276,850
METHOD OF SELECTIVELY REDUCING PLUTONIUM VALUES
Robert H. Rainey, Knoxville, Tenn., assignor to the United States of America as represented by the United States Atomic Energy Commission
No Drawing. Filed Mar. 10, 1965, Ser. No. 438,799
5 Claims. (Cl. 23—341)

My invention relates in general to methods of separating plutonium, uranium and fission products from each other and specifically to solvent extraction methods of separating plutonium from uranium.

The Purex process is the only method presently used on a large scale for recovering uranium and plutonium from irradiated fuels. Briefly, this process comprises extracting hexavalent uranium and tetravalent plutonium from an aqueous nitric acid solution with tributylphosphate in a kerosene-type diluent. The extracted plutonium and uranium are then separated by selectively reducing plutonium to the organic insoluble trivalent state with ferrous sulfamate. It is essential that little or no uranium be reduced since $U^{+4}$ is more highly complexed than $(UO_2)^{+2}$ and therefore is more difficult to remove from the organic phase in a subsequent step in the Purex process. The Purex process is described in Proceedings of the International Conference on the Peaceful Uses of Atomic Energy, Geneva, 1955, vol. 9. A method of reducing plutonium to the trivalent oxidation state using ferrous sulfamate is described in U.S. Patent No. 2,849,277 issued August 26, 1958, to John R. Thomas.

Although ferrous sulfamate reduces plutonium without reducing uranium, its use in the Purex process introduces problems in subsequent operations, particularly in storing waste aqueous solutions. The iron precipitates in alkaline solutions and the resulting solids cause problems in self-boiling high-level wastes. The sulfate presents problems in preparing fired bodies for fixed-solids waste disposal by increasing the solubility of the fired solids. An alkali must be added to the sulfate-containing waste to retain the sulfate during firing and this addition of alkali increases the volume, the corrosion problems, and the cost of fixed-solids waste disposal.

Modifications to the Purex process have been suggested to eliminate the problems caused by ferrous sulfamate. One such modification involves the use of U (IV) as a reductant. While the use of U (IV) decreases the waste disposal problem, U (IV) is unstable and must be prepared shortly before use. Also, for economic reasons, the uranium used as a reductant would have to match the isotropic composition of the uranium being processed.

It is accordingly one object of my invention to provide an improvement in a process for separating plutonium from uranium.

It is another object to provide an improved method of reducing plutonium in a solvent extraction process for separating plutonium from uranium.

Other objects of my invention will be apparent from the following description and the claims appended hereto.

I have discovered that hydrogen in the presence of a hydrogenation catalyst reduces plutonium values to the trivalent state so rapidly compared to the reduction of $(UO_2)^{+2}$ that selective reduction of plutonium can be achieved. In accordance with my invention I have provided in a liquid-liquid extraction process for separating plutonium values from uranium values comprising the steps of contacting an aqueous solution containing plutonium values and uranium values with a substantially water-immiscible organic solution of tributylphosphate under conditions whereby plutonium and uranium values transfer into said organic solution; separating the resulting organic solution from the depleted aqueous solution; and contacting the separated organic solution with an aqueous stripping solution containing a reducing agent capable of selectively reducing plutonium to the trivalent state, whereby plutonium values selectively transfer into said aqueous stripping solution, the improvement wherein said reducing agent comprises hydrogen and said contact is made in the presence of a hydrogenation catalyst.

By my process plutonium is selectively reduced, yet no interfering contaminants are introduced into the process solutions. Under other conditions hydrogen has been used to reduce hexavalent uranium to the tetravalent state. A surprising feature of my process is that $(UO_2)^{+2}$ remains virtually unreduced although plutonium is substantially completely reduced.

In carrying out my process a gaseous mixture containing hydrogen is brought into contact with the organic solution in the presence of an acidic aqueous solution and a hydrogenation catalyst.

Any method of effecting contact between the gas, liquids and solids may be used. One especially effective method is to provide the catalyst in the form of a bed of solids into which the liquids and the gas is introduced.

The concentration of hydrogen is not critical for the successful operation of this process and even with pure hydrogen gas the rate of reduction of uranium is low. In the preferred method of carrying out this reduction step the concentration of hydrogen is maintained at about 4 volume percent. Higher concentrations not only introduce the hazards of an explosion, but also reduce greater quantities of $(UO_2)^{+2}$, and it is desirable to minimize the amount of $(UO_2)^{+2}$ reduced. A concentration of hydrogen below about 4 volume percent has the adverse effect of increasing the total gas flow required with no compensating advantage.

Any hydrogenation catalyst may be used in my process, and platinized alumina is highly effective.

Although $(UO_2)^{+2}$ is reduced by hydrogen, the rate is so slow that the length of time of the contact between hydrogen and the organic solution is not critical; however, in order to minimize the amount of $(UO_2)^{+2}$ reduced the contact time should not exceed that required for complete reduction of the plutonium. A contact time less than about one hour is preferred.

The temperature at which my process is carried out is not critical and a temperature of 10° C. to 30° C. is suitable.

Having thus described my invention, the following examples are offered to illustrate it in more detail.

*Example I*

An organic solution comprising 30 percent tributylphosphate in n-dodecane containing 95 grams/liter uranium and 1 gram/liter plutonium and 0.1 molar in $HNO_3$ was contacted with an equal volume of an aqueous solution of 0.5 molar $HNO_3$. These solutions were introduced concurrently with 4 percent hydrogen in argon into the bottom of a column ¾ inch in diameter and 7 inches long packed with 0.5 percent platinum on alumina pellets. The void volume was about 50 percent. The liquid flow rate was 180 milliliters in 75 minutes, providing a ten-minute holdup. The gas was introduced at a rate adequate to maintain a stable column of solids and fluids.

Analyses showed that over 99 percent of the plutonium was reduced and transferred to the aqueous phase. The amount of uranium reduced from $(UO_2)^{+2}$ was less than one percent.

As can be seen from Example I my method selectively reduces plutonium to the organic insoluble trivalent state. Example II is offered to show the effect of a higher concentration of hydrogen.

*Example II*

The procedure of Example I is followed using 100 percent hydrogen as the reducing agent. Over 99 percent of the plutonium and about 3 percent of the uranium are reduced. As can be seen from this example pure hydrogen selectively reduces plutonium values; however, the quantity of uranium reduced is substantially greater than in the case where 4 percent hydrogen was used.

The foregoing examples are intended to illustrate, not limit, my invention, which should be limited only in accordance with the following claims.

Having thus described my invention I claim:

1. In a liquid-liquid extraction process for separating plutonium values from uranium values comprising the steps of contacting an aqueous solution containing plutonium values and uranium values with a substantially water-immiscible organic solution of tributylphosphate under conditions whereby plutonium and uranium values transfer into said organic solution; separating the resulting organic solution from the depleted aqueous solution; and contacting the separated organic solution with an aqueous stripping solution containing a reducing agent capable of selectively reducing plutonium to the trivalent state whereby plutonium values selectively transfer into said aqueous stripping solution, the improvement wherein said reducing agent is a gaseous mixture containing hydrogen and said contact is made in the presence of a hydrogenation catalyst.

2. The process of claim 1 wherein the hydrogenation catalyst is platinized alumina.

3. The process of claim 1 wherein the gaseous mixture contains hydrogen in an amount of about four percent by volume.

4. The process of claim 1 wherein the residence time of the solutions in contact with the hydrogen is less than about one hour.

5. The process of claim 1 wherein said reducing agent is a gaseous mixture containing about four volume percent hydrogen, said hydrogenation catalyst is platinized alumina, and the residence time of the solutions in contact with the hydrogen is less than one hour.

No references cited.

BENJAMIN R. PADGETT, *Primary Examiner.*

S. TRAUB, *Assistant Examiner.*